(12) United States Patent
Kanechika

(10) Patent No.: US 12,538,385 B2
(45) Date of Patent: Jan. 27, 2026

(54) HEATER CONTROLLER, HEATER CONTROL METHOD, VEHICLE LAMP

(71) Applicant: Stanley Electric Co., Ltd., Tokyo (JP)

(72) Inventor: Masayuki Kanechika, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 859 days.

(21) Appl. No.: 17/839,504

(22) Filed: Jun. 14, 2022

(65) Prior Publication Data

US 2022/0400534 A1    Dec. 15, 2022

(30) Foreign Application Priority Data

Jun. 15, 2021 (JP) .............................. 2021-099712

(51) Int. Cl.
| | |
|---|---|
| H05B 1/02 | (2006.01) |
| B60Q 1/00 | (2006.01) |
| F21S 45/60 | (2018.01) |
| G01S 17/931 | (2020.01) |
| H05B 3/14 | (2006.01) |
| H05B 3/84 | (2006.01) |

(52) U.S. Cl.
CPC ......... *H05B 1/0236* (2013.01); *B60Q 1/0005* (2013.01); *F21S 45/60* (2018.01); *H05B 3/141* (2013.01); *H05B 3/84* (2013.01); *G01S 17/931* (2020.01); *H05B 2203/013* (2013.01)

(58) Field of Classification Search
CPC ........ H05B 1/0236; H05B 3/141; H05B 3/84; H05B 2203/013; F21S 45/60; B60Q 1/0005; G01S 17/931
See application file for complete search history.

(56) References Cited

U.S. PATENT DOCUMENTS

| | | | |
|---|---|---|---|
| 2019/0017677 A1* | 1/2019 | Beauchamp | ............ F21S 41/20 |
| 2021/0116544 A1 | 4/2021 | Yamamoto | |
| 2021/0188219 A1* | 6/2021 | Yamamoto | .............. G01S 7/497 |

FOREIGN PATENT DOCUMENTS

| | | |
|---|---|---|
| DE | 11 2019 004439 T5 | 5/2021 |
| JP | H10-311787 A | 11/1998 |
| JP | 2017-133079 A | 8/2017 |
| JP | 2020-003455 A | 1/2020 |
| JP | 2020-030908 A | 2/2020 |
| WO | 2021/095666 A1 | 5/2021 |

OTHER PUBLICATIONS

Extended European Search Report issued Oct. 21, 2022 in corresponding European Patent Application No. 22179106.4 (9 pages).
Office Action issued on Mar. 4, 2025, in corresponding Japanese patent Application No. 2021-099712, 8 pages.

* cited by examiner

*Primary Examiner* — Brian W Jennison
(74) *Attorney, Agent, or Firm* — XSENSUS LLP

(57) ABSTRACT

To avoid an adverse effect on the sensor by the heater. A controller for a heater installed in a vehicle lamp, where the controller detects a rising edge of a light emission period of a sensor light emitted from an object detection sensor built in the vehicle lamp, and starts supply of a drive voltage to the heater in accordance with the rising edge.

19 Claims, 6 Drawing Sheets

HEATER CONTROLLER, HEATER CONTROL METHOD, VEHICLE LAMP

CROSS-REFERENCE TO RELATED APPLICATION

The present application claims priority to Japanese Patent Application 2021-099712, filed Jun. 15, 2021, the entire contents of which are incorporated herein by reference.

BACKGROUND

Technical Field

The present disclosure relates to a heater controller, heater control method, and a vehicle lamp.

Description of the Background Art

Japanese Unexamined Patent Application Publication No. 2020-30908 (Patent Document 1) discloses a heater system equipped with a heater provided on the rear surface of a vehicle, a temperature sensor that measures outside air temperature, and a control unit that performs power supply control of the heater according to the measured value of the temperature sensor, where the heater system turns on the heater power when the measured value of the outside air temperature is at or above a first temperature and below a second temperature, and turns off the heater power when the measured value is below the first temperature or at or above the second temperature. The heater is provided, for example, in a taillight of the vehicle.

In recent years, in order to configure a driving support system or an automatic driving system, for example, an object detection sensor used for LiDAR (Light Detection And Ranging) technology, etc. is often installed in a vehicle.

Here, consider a case where the above-described object detection sensor is built in a vehicle lamp. In this case, when the heater power is turned on, the energy at the rising edge of the current is electromagnetically radiated and thereby noise jumps into a drive circuit of the object detection sensor, which may have an adverse effect (for example, a decrease in detection accuracy).

In a specific aspect, it is an object of the present disclosure to provide a technique capable of avoiding an adverse effect on a sensor by the heater.

SUMMARY (1) A controller for a heater according to one aspect of the present disclosure is (a) a controller for a heater installed in a vehicle lamp, (b) where the controller detects a rising edge of a light emission period of a sensor light emitted from an object detection sensor built in the vehicle lamp, and starts supply of a drive voltage to the heater in accordance with the rising edge.

(2) A vehicle lamp according to one aspect of the present disclosure is a vehicle lamp including: the controller for the heater described in the above (1), the heater controlled by the controller, and an object detection sensor.

(3) A control method for a heater according to one aspect of the present disclosure is (a) a control method for a heater installed in a vehicle lamp, where the control method includes (b) to detect a rising edge of a light emission period of a sensor light emitted from an object detection sensor built in the vehicle lamp, and (c) to start supply of a drive voltage to the heater in accordance with the rising edge.

According to the above configurations, it is possible to avoid an adverse effect on the sensor by the heater.

DESCRIPTION OF THE PREFERRED EMBODIMENTS

Figure 1A:
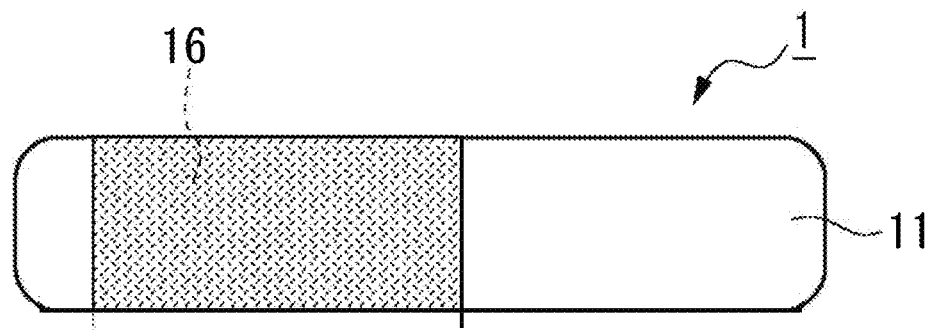
FIG. 1A is a schematic view of the appearance of a vehicle lamp of one embodiment as viewed from the front side.
Figure 1B:
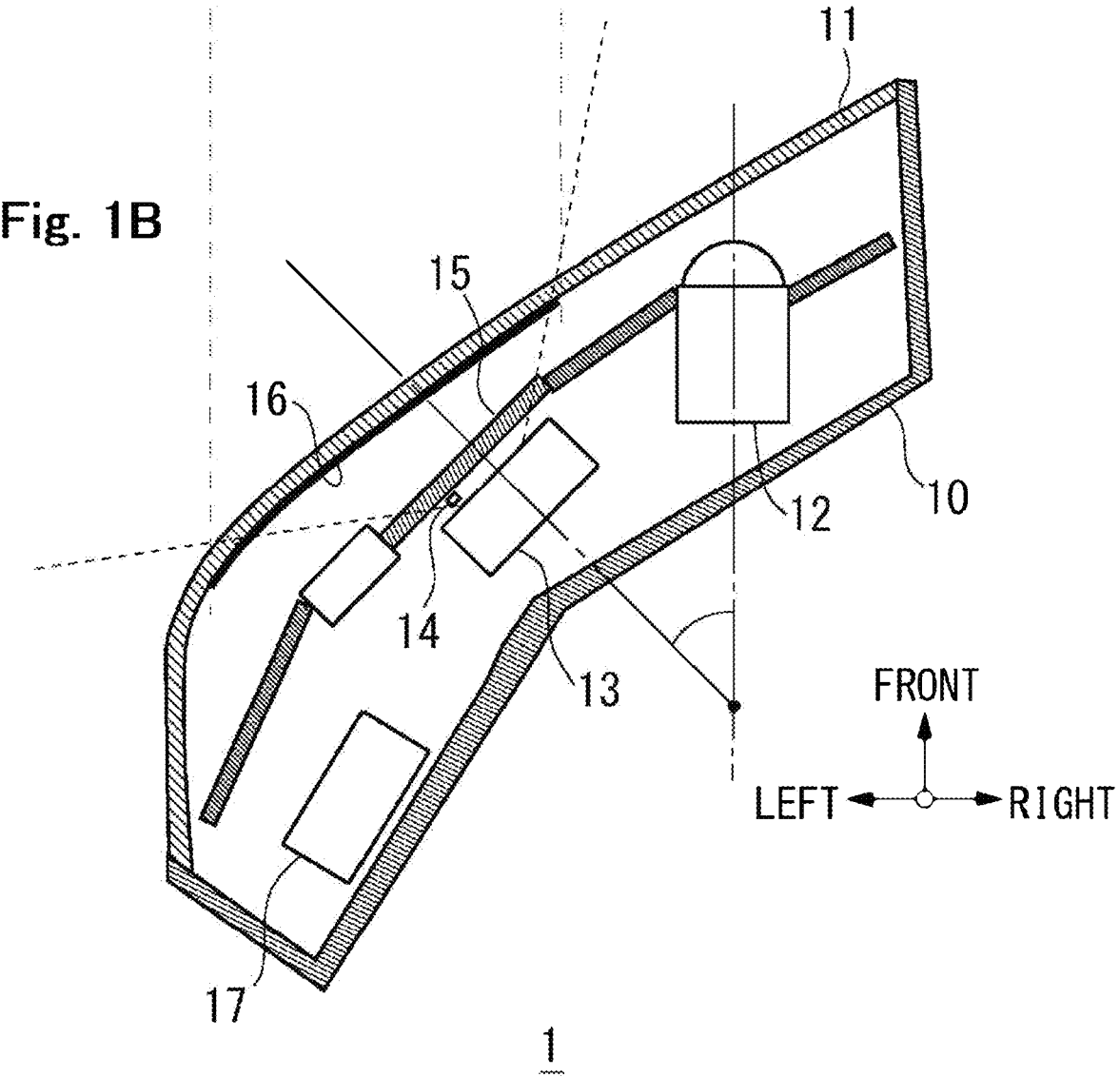
FIG. 1B is a diagram showing the internal structure of the vehicle lamp.

FIG. 1A is a schematic view of the appearance of a vehicle lamp of one embodiment as viewed from the front side. FIG. 1B is a diagram showing the internal structure of the vehicle lamp, and is a view of FIG. 1A cut along a horizontal plane and viewed from above. The vehicle lamp 1 of the present embodiment shown in each figure is arranged at the front of the vehicle and used as a headlight, for example. Here, only one vehicle lamp 1 arranged either on the left or right side is shown. The vehicle lamp 1 is configured to include a housing 10, an outer lens 11, a lamp unit 12, an object detection sensor 13, an optical sensor 14, an optical filter 15, a heater 16, and a controller 17.

The housing 10 houses the lamp unit 12, the object detection sensor 13, the optical sensor 14, the optical filter 15, the heater 16, and the controller 17 of the vehicle lamp 1, and is configured by using an appropriate material such as plastic.

The outer lens 11 is a front cover attached to the housing 10, and protects each of the lamp unit 12 and the like arranged inside the housing 10. The outer lens 11 is formed of a material that transmits light.

The lamp unit 12 is arranged in the housing 10, and is turned on and off under the control of the controller 17. The light from the lamp unit 12 is emitted to the outside through the outer lens 11 and is irradiated to the front of the vehicle.

The object detection sensor 13 emits pulsed laser light (sensor light) while scanning a wide range in front of the vehicle, and detects the shape of a target object and the relative distance to the target object by detecting the reflected light obtained by reflecting the laser light on the surface of the target object. In this embodiment, a LiDAR (Light Detection and Ranging/Laser Imaging Detection and Ranging) device is used as the object detection sensor 13. The laser light emitted from the object detection sensor 13 of the present embodiment is, for example, a laser light having a near infrared wavelength of about 750 nm to 1.5 μm.

The optical sensor 14 is provided at a position where a part of the laser light emitted from the object detection sensor 13 can be incident, such as the front side of the object detection sensor 13, detects the incident laser light and outputs to the controller 17 a detection signal according to the incident laser light intensity.

The optical filter 15 is a bandpass filter that transmits light of a specific wavelength and attenuates light of other wavelengths. As the optical filter 15 of the present embodiment, a bandpass filter set to transmit light in accordance with the wavelength of the laser light of the object detection sensor 13 and attenuate light of other wavelengths, particularly far infrared wavelengths (for example, 3.0 μm to 1 mm) emitted from the heater 16, is used.

The heater 16 is for generating heat in order to prevent snow accretion or the like on the outer lens 11. The heater 16 is arranged, for example, inside the outer lens 11 as shown in the figure, at least in a range in accordance with the emission range of the laser light of the object detection sensor 13. As the heater 16, at least a conductive film having high transparency to the laser light emitted by the object detection sensor 13 is used. For example, it is preferable to configure the heater 16 by using a ZnO film having high conductivity and high light transmittance over a wide band as disclosed in Japanese Unexamined Patent Application Publication No. 2017-133079.

The controller 17 controls turning on and off of the lamp unit 12 and controls the operation of the heater 16. The controller 17 is connected to each of the lamp unit 12, the optical sensor 14, and the heater 16. The controller 17 is realized by using, for example, a computer having a CPU (Central Processing Unit), a ROM (Read Only Memory), a RAM (Random Access Memory), and the like, and executing a predetermined operation program on the computer.

Figure 2:
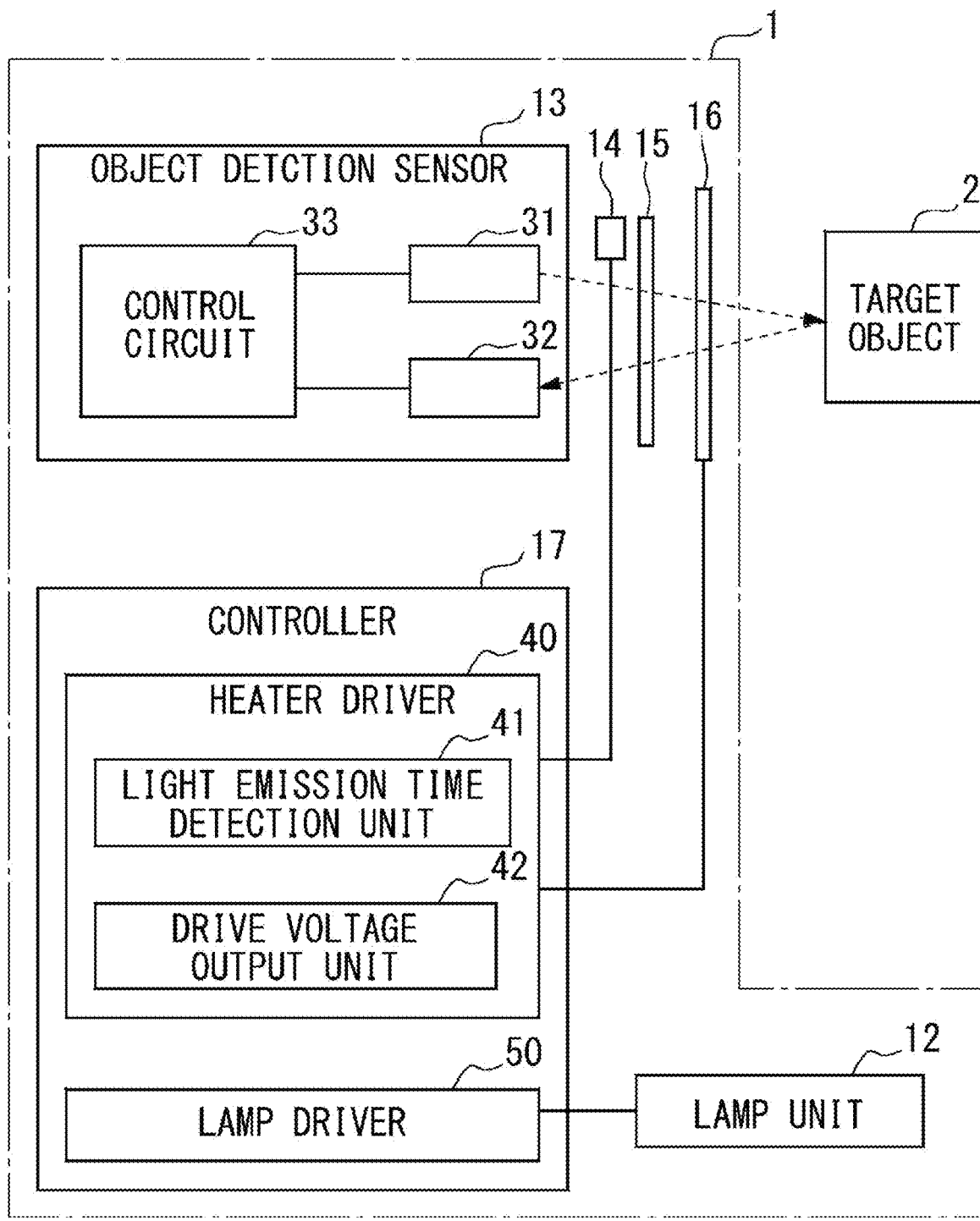
FIG. 2 is a block diagram for explaining a configuration related to operation control of the vehicle lamp.

FIG. 2 is a block diagram for explaining a configuration related to operation control of the vehicle lamp. As shown in the figure, the object detection sensor 13 is configured to include a light emitting unit 31, a light receiving unit 32, and a control circuit 33. Further, the controller 17 is configured to include a heater driver 40 and a lamp driver 50. The heater driver 40 is configured to include a light emission time detection unit 41 and a drive voltage output unit 42.

The light emitting unit 31 of the object detection sensor 13 emits laser light while scanning in a two-dimensional direction or a three-dimensional direction. A part of the emitted laser light is detected by the optical sensor 14. The position of the optical sensor 14 is preferably a position that does not affect the scanning of the laser light by the light emitting unit 31. The emitted laser light passes through the optical filter 15 and the heater 16 and is emitted to the outside, and is reflected by the target object 2.

The light receiving unit 32 of the object detection sensor 13 receives the light reflected by the target object 2 and outputs a detection signal according to its intensity. The control circuit 33 controls the operation of the light emitting unit 31, and based on the intensity of the reflected light received by the light receiving unit 32 and the timing thereof, generates a distance image that includes distance with respect to the target body 2 and the shape, etc., of the target body 2. The generated distance image data is supplied to a higher-level device which is not shown in the figure.

The heater driver 40 controls the operation of the heater 16. The lamp driver 50 controls turning on and off of the lamp unit 12.

The light emission time detection unit 41 of the heater driver 40 detects the rising edge (light emission time) of the light emission period of the laser light emitted from the object detection sensor 13 based on the detection signal from the optical sensor 14. The drive voltage output unit 42 starts supply of drive voltage to the heater in accordance with the rising edge of the laser light detected by the light emission time detection unit 41.

Figure 3A:
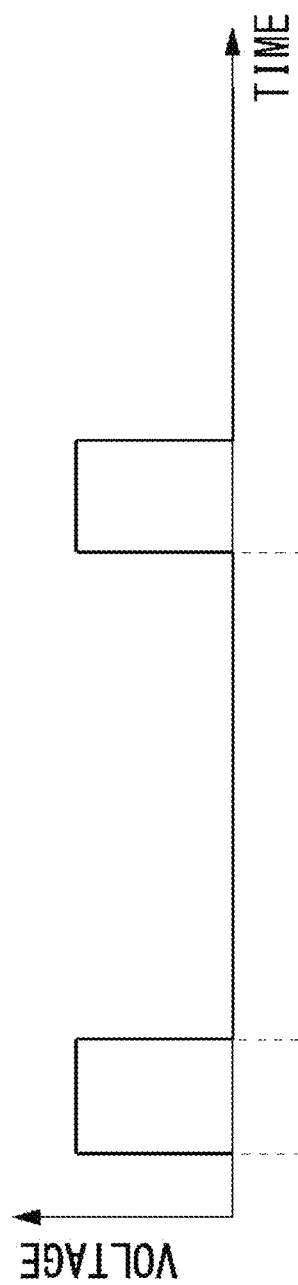
FIG. 3A is a diagram showing an example of a drive voltage waveform of the heater.
Figure 3B:
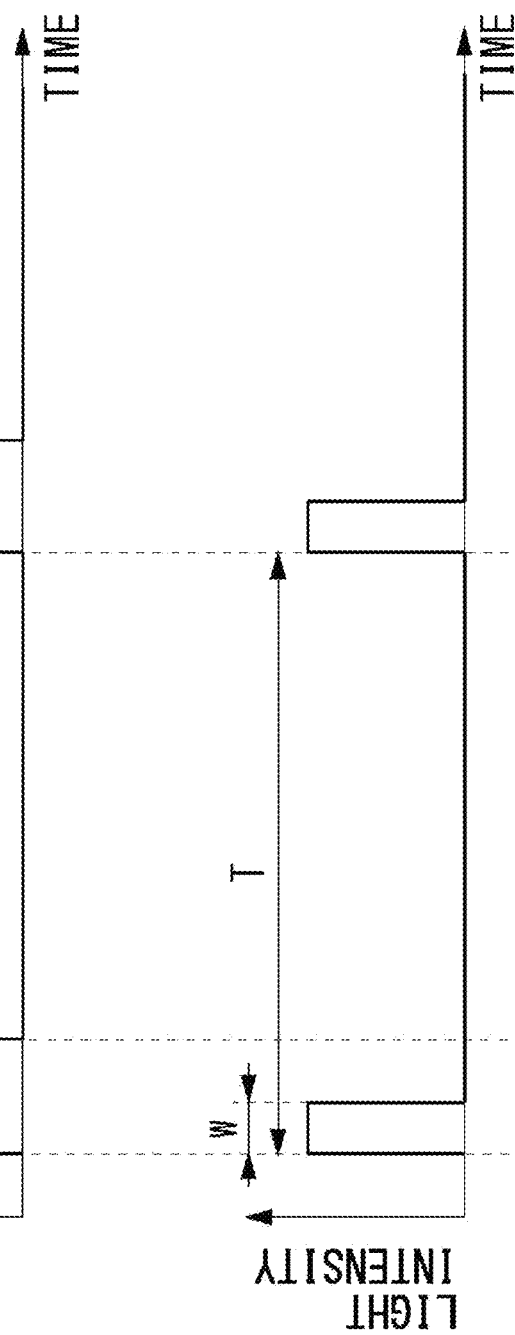
FIG. 3B is a diagram showing an example of a light intensity waveform of the laser light emitted from the object detection sensor 13.
Figure 3C:
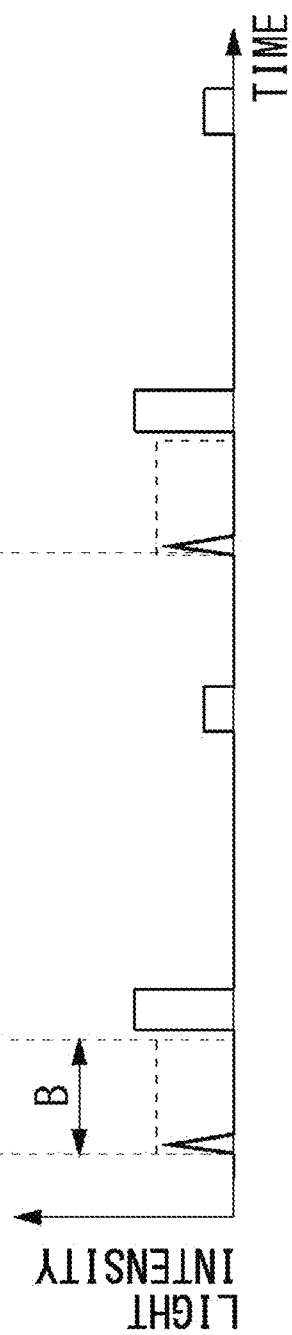
FIG. 3C is a diagram showing an example of a light intensity waveform of the light received by the object detection sensor 13.

FIG. 3A is a diagram showing an example of a drive voltage waveform of the heater. FIG. 3B is a diagram showing an example of a light intensity waveform of the laser light emitted from the object detection sensor 13. FIG. 3C is a diagram showing an example of a light intensity waveform of the light received by the object detection sensor 13.

As shown in FIG. 3B, the laser light emitted from the object detection sensor 13 is intermittently and repeatedly emitted at regular intervals. The pulse width W and the repetition period T of the laser light are appropriately set according to the distance resolution, the maximum detection distance, and the like. For example, if the distance resolution is 75 cm, the pulse width W is set to 5 ns, and if the maximum detection distance is 200 m, the repetition period T is set to 40 ms (which corresponds to 25 Hz) which includes the internal processing time, etc. Further, as shown in FIG. 3C, in order to prevent erroneous detection when detecting the reflected light, a reception blank period B, which is a period in which the reflected light is ignored within a certain period from the emission time of the laser light, is provided. This reception blank period B is set to a period of 10 ns starting from the emission time of the laser light, for example.

In response to such operation of the object detection sensor 13, the light emission time detection unit 41 of the heater driver 40 detects the rising edge of the laser light using the detection signal output from the optical sensor 14. In accordance with the rising edge that is detected, as shown in FIG. 3A, the drive voltage output unit 42 starts supply of drive voltage to the heater 16. As shown, the drive voltage is repeatedly supplied every time the laser light is emitted. By increasing or decreasing the number of repetitions or intermittently supplying the drive voltage, the temperature of the heater 16 can be controlled.

As a result, even if noise (waveform shown in a spike shape in FIG. 3C) due to electromagnetic radiation of energy accompanying the start of drive voltage supply to the heater 16 jumps into the receiving unit 32 of the object detection sensor 13, since it is within the above-described reception blank period, it can be removed as noise. Therefore, it is possible to detect the target object 2 even when the light intensity of the reflected light is low.

Here, note that "in accordance with the rising edge" means that after the rising edge of the laser light is detected, drive voltage supply is started after an extremely small delay time. Generally, it can be said that it is synchronized with the rising edge, but in principle, it does not mean that the rising edge and the start time of the drive voltage supply are exactly the same.

Further, as shown in FIG. 3A, after starting supply of the drive voltage, the drive voltage output unit 42 stops supply of the drive voltage at an appropriate time before the reception blank period B elapses. In the illustrated example, the drive voltage supply is stopped at about the same time as the end of the reception blank period B.

Figure 4A:
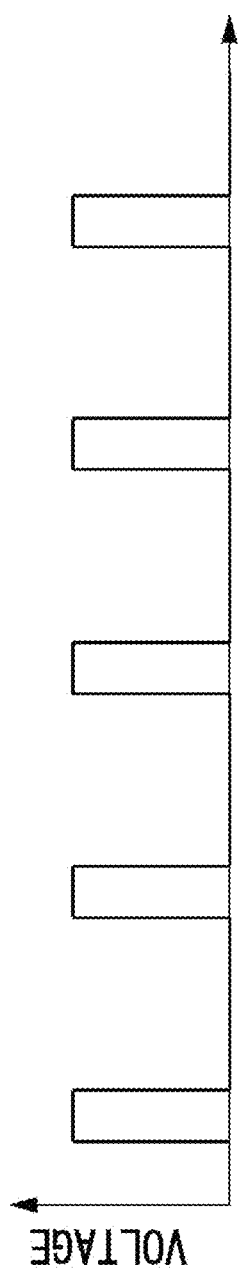
FIG. 4A is a diagram showing an example of a drive voltage waveform of a heater of a comparative example.
Figure 4B:
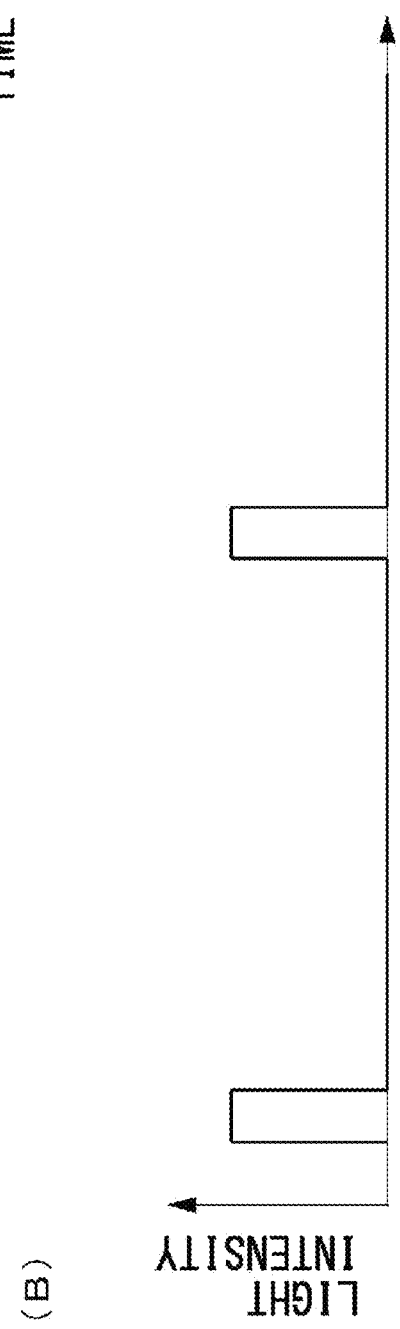
FIG. 4B is a diagram showing an example of a light intensity waveform of the laser light emitted from the object detection sensor 13 of the comparative example.
Figure 4C:
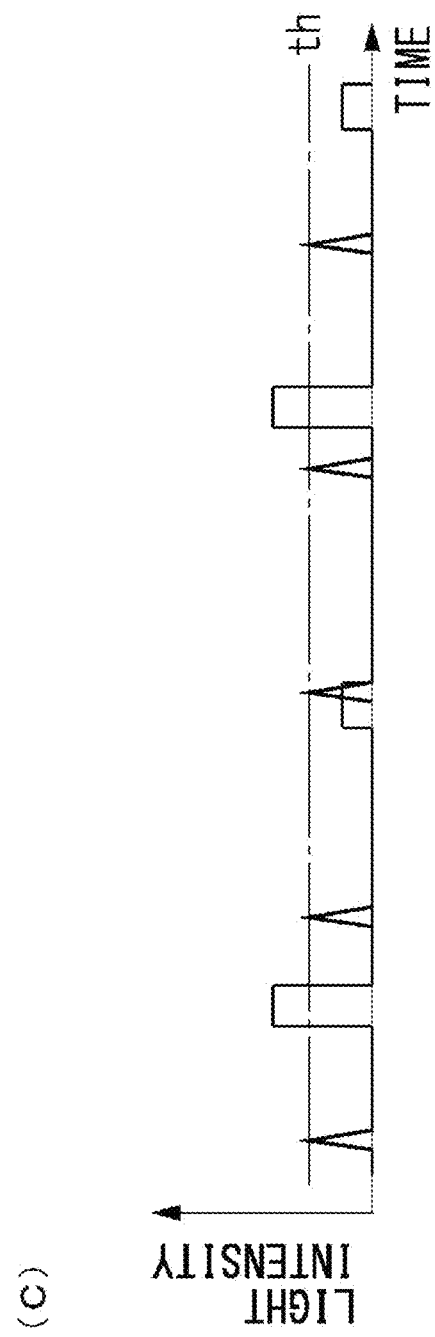
FIG. 4C is a diagram showing an example of a light intensity waveform of the light received by the object detection sensor 13 of the comparative example.

FIG. 4A is a diagram showing an example of a drive voltage waveform of a heater of a comparative example. FIG. 4B is a diagram showing an example of a light intensity waveform of the laser light emitted from the object detection sensor 13 of the comparative example. FIG. 4C is a diagram showing an example of a light intensity waveform of the light received by the object detection sensor 13 of the comparative example. The comparative example here is an operation example where the drive voltage of the heater 16 is not associated with the emission time of the laser light emitted from the object detection sensor 13.

As shown in FIGS. 4A and 4B, it is assumed that the drive voltage of the heater is intermittently supplied without being linked to the emission time of the laser light from the object detection sensor 13. In this case, as shown in FIG. 4C, in order to remove noise (spike-like waveform) due to the drive voltage to the heater, for example, assuming that threshold level "th" that is set in accordance with the noise is established, the reflected light received at a light intensity lower than the threshold level would also be excluded. Therefore, there may be a case where it is not possible to detect the target object 2 existing in the distance.

Figure 5:
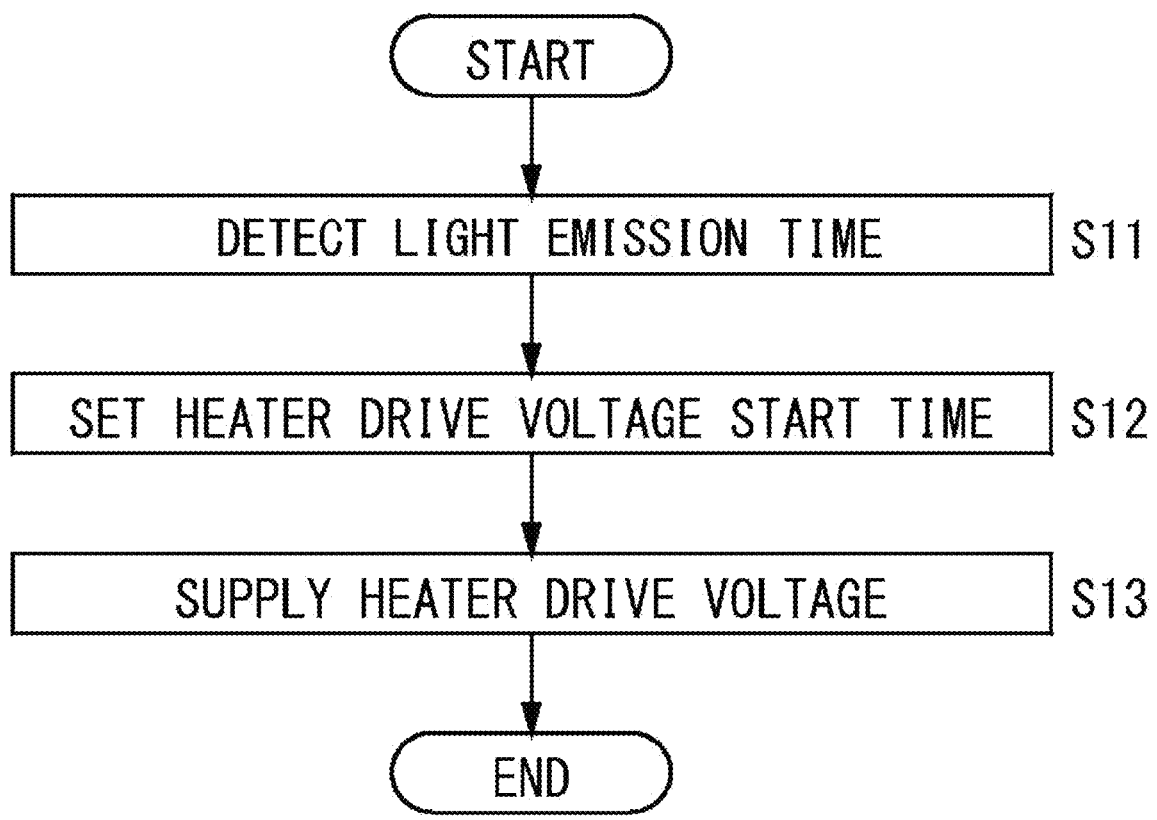
FIG. 5 is a flowchart showing the flow of operation by the heater driver of the controller.

FIG. 5 is a flowchart showing the flow of operation by the heater driver of the controller. It should be noted that heat control by this heater driver is performed when the environmental temperature (ambient temperature of the vehicle lamp) detected by a temperature sensor (not shown) or the like becomes equal to or lower than a predetermined reference value, for example.

The light emission time detection unit 41 of the heater driver 40 detects the rising edge (light emission time) of the light emission period of the laser light emitted from the object detection sensor 13 based on a detection signal from the optical sensor 14 (STEP S11).

Next, the drive voltage output unit 42 of the heater driver sets start time of the drive voltage to the heater in accordance with the rising edge of the laser light detected by the light emission time detection unit 41 (STEP S12), and starts supply of the drive voltage (STEP S13). Here, although the time period until the end of the drive voltage supply is predetermined, it may be appropriately set by the drive voltage output unit.

Thereafter, the process returns to STEP S11. As a result, the drive voltage is intermittently applied to the heater 16 at a cycle in accordance with the repeating cycle of the laser light.

Figure 6A:
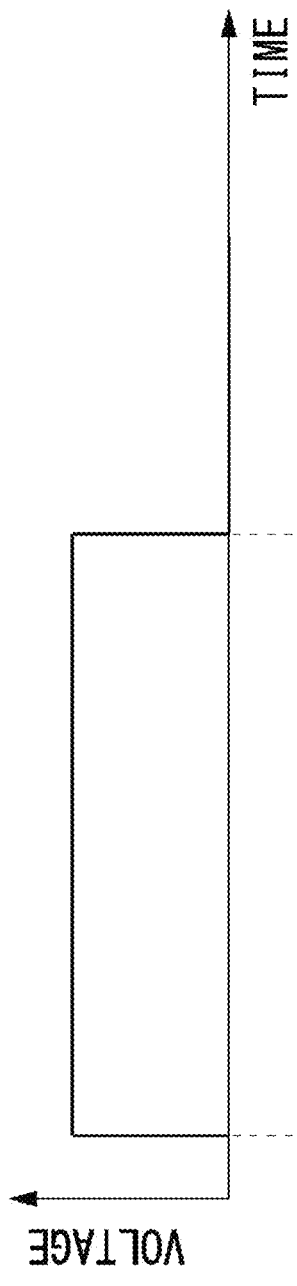
FIG. 6A is a diagram showing an example of a drive voltage waveform of the heater of a modified embodiment.
Figure 6B:
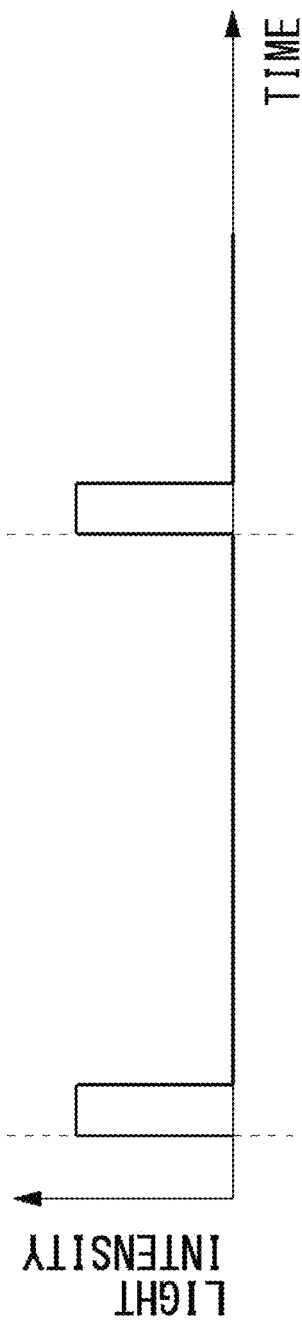
FIG. 6B is a diagram showing an example of a light intensity waveform of the laser light emitted from the object detection sensor 13 of the modified embodiment.
Figure 6C:
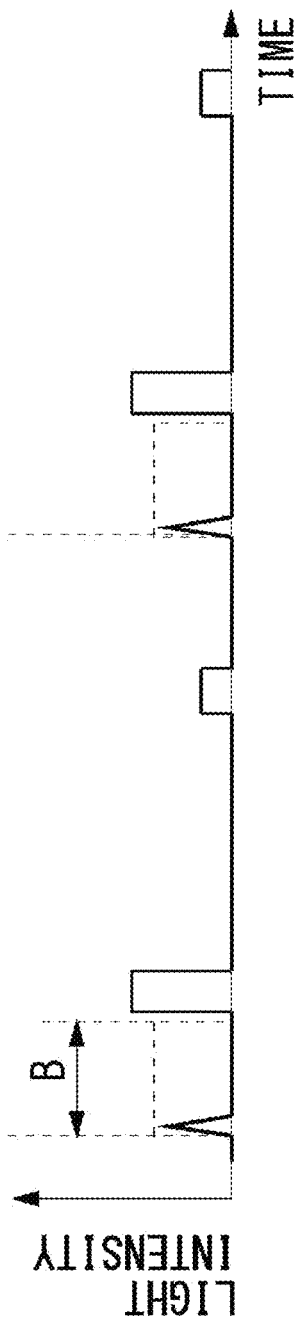
FIG. 6C is a diagram showing an example of a light intensity waveform of the light received by the object detection sensor 13 of the modified embodiment.

FIG. 6A is a diagram showing an example of a drive voltage waveform of the heater of a modified embodiment. FIG. 6B is a diagram showing an example of a light intensity waveform of the laser light emitted from the object detection sensor 13 of the modified embodiment. FIG. 6C is a diagram showing an example of a light intensity waveform of the light received by the object detection sensor 13 of the modified embodiment. As shown in FIGS. 6A and 6B, after supply of the drive voltage to the heater is started in accordance with the rising edge of the laser light of a first period, supply of the drive voltage may be stopped in accordance with the rising edge of the laser light of a second period which arrives after the first period. In this case, in the illustrated example, the second laser light emission time is defined as the second period, but the present disclosure is not limited thereto, and the third laser light emission time or subsequent laser light emission time may be defined as the second period. For example, the operation may be such that, supply of the drive voltage is started in accordance with the rising edge of the first laser light, the drive voltage is continuously supplied without being linked to the second laser light, then supply of the drive voltage is stopped in accordance with the rising edge of the third laser light. Since large noise due to the drive voltage supplied to the heater is generated at the rise (start time) of the drive voltage supply, as described above, the effect of the noise can be avoided as well by setting the start time and the stop time of the drive voltage supply in conjunction with the rising edge of the laser light (refer to FIG. 6C).

According to the above embodiments, it is possible to avoid an adverse effect on the sensor by the heater.

It should be noted that the present disclosure is not limited to the subject matter of the foregoing embodiment, and can be implemented by being variously modified within the scope of the present disclosure as defined by the appended claims. For example, in the above-described embodiments, rising edge of the laser light is detected by using the optical sensor 14, but if a signal indicating the rising edge can be obtained directly from the object detection sensor 13, the signal may be used to perform rising edge detection operation in the emission time detection unit 41 of the controller 17.

Further, in the above-described embodiments, the controller 17 in which the heater driver 40 and the lamp driver 50 are integrated has been exemplified, but the heater driver 40 and the lamp driver 50 may be configured separately.

Further, in the above-described embodiment, a headlight is shown as an example of the vehicle lamp, but the vehicle lamp is not limited thereto, and a tail light may be used, for example.

The present application is based on, and claims priority from, JP Application Serial Number, 2021-099712 filed on Jun. 15, 2021, the disclosure of which is hereby incorporated by reference herein in its entirety.

DESCRIPTION OF THE REFERENCE NUMERALS

1:Vehicle lamp
10:Housing
11: Outer lens
12:Lamp unit
13:Object detection sensor
14:Optical sensor
15:Optical filter
16:Heater
17:Controller
31:Light emitting unit
32:Light receiving unit
33:Control circuit
40:Heater driver
41:Light emission time detection unit
42:Drive voltage output unit
50:Lamp driver

What is claimed is:
1. A controller for a heater installed in a vehicle lamp,
wherein the controller detects a rising edge of a light emission period of a sensor light emitted from an object detection sensor built in the vehicle lamp, and starts supply of a drive voltage to the heater in accordance with the rising edge, wherein the sensor light is intermittently and repeatedly emitted, and wherein the drive voltage is supplied every time the sensor light is emitted.

2. The controller for the heater according to claim 1, wherein the controller comprises:
a detection unit that detects the rising edge, and
a feeding unit that supplies the drive voltage.

3. The controller for the heater according to claim 1, wherein the controller further comprises an optical sensor that detects the intensity of the sensor light, and detects the rising edge based on a detection signal from the optical sensor.

4. The controller for the heater according to claim 1, wherein, after the sensor light is emitted, supply of the drive voltage is stopped until a time that corresponds to the minimum detection distance of the object detection sensor elapses.

5. The controller for the heater according to claim 1, wherein supply of the drive voltage is started in accordance with the rising edge of a first period, and the supply is stopped in accordance with the rising edge of a second period which arrives after the first period.

6. The controller for the heater according to claim 1, wherein the heater is a ZnO film provided inside the front cover of the vehicle lamp.

7. A control method for a heater installed in a vehicle lamp, comprising:
detecting a rising edge of a light emission period of a sensor light emitted from an object detection sensor built in the vehicle lamp, wherein the sensor light is intermittently and repeatedly emitted; and
starting supply of a drive voltage to the heater in accordance with the rising edge, wherein the drive voltage is supplied every time the sensor light is emitted.

8. The controller for the heater according to claim 3, wherein, after the sensor light is emitted, supply of the drive voltage is stopped until a time that corresponds to the maximum detection distance of the object detection sensor elapses.

9. The controller for the heater according to claim 3, wherein supply of the drive voltage is started in accordance with the rising edge of a first period, and the supply is stopped in accordance with the rising edge of a second period that follows the first period.

10. A vehicle lamp comprising:
a housing;
an outer lens disposed on the front surface of the housing;
a lamp disposed within the housing and irradiating light to the outside through the outer lens;
an object detection sensor having a light emitter that emits sensor light and a light receiver that receives reflected light reflected from an object to be detected;
a heater disposed within a range corresponding to an emission range of the sensor light; and
a heater driver connected to the heater, the heater detecting a light emission timing and outputting a drive voltage;
wherein the object detection sensor includes circuitry configured to control the light emitter to intermittently and repeatedly emit the sensor light, and to provide a reception blank period during which the reflected light received by the light receiver is ignored within a certain period from the emission of the sensor light, wherein the heater driver detects a rising edge of a light emission period of the sensor light emitted from the light emitter of the object detection sensor, and wherein the heater driver sets a start time for starting supply of a drive voltage to the heater from the heater driver within the reception blank period in response to the rising edge, and supplies the drive voltage every time the sensor light is emitted or intermittently in conjunction with the emission of the sensor light so that the light emission period of the sensor light and a period for supplying the drive voltage overlap.

11. The vehicle lamp according to claim 10, wherein the supply of the drive voltage is stopped after the sensor light is emitted and before the light-receiving blank period has elapsed.

12. The vehicle lamp according to claim 10, wherein the supply of the drive voltage is started in response to the rising edge of a first period, and the supply is stopped in response to the rising edge of a second period that arrives after the first period.

13. The vehicle lamp according to claim 11 further comprising:
an optical sensor connected to the heater driver and detects the intensity of the sensor light, and
wherein the heater driver detects the rising edge based on a detection signal from the optical sensor.

14. The vehicle lamp according to claim 12 further comprising:
an optical sensor connected to the heater driver and detects the intensity of the sensor light, and
wherein the heater driver detects the rising edge based on a detection signal from the optical sensor.

15. The vehicle lamp according to claim 10, wherein the heater is a ZnO film provided inside the front cover of the vehicle lamp.

16. The control method according to claim 7, further comprising:
controlling a light emitter of the object detection sensor to intermittently and repeatedly emit the sensor light, and to provide a reception blank period during which the reflected light received by a light receiver of the object detection sensor is ignored within a certain period from the emission of the sensor light.

17. The control method according to claim 16, further comprising:
setting a start time for starting supply of a drive voltage to the heater from a heater driver within the reception blank period in response to the rising edge; and
supplying the drive voltage every time the sensor light is emitted or intermittently in conjunction with the emission of the sensor light so that the light emission period of the sensor light and a period for supplying the drive voltage overlap.

18. The control method according to claim 16, further comprising:
setting a start time of a drive voltage to the heater in accordance with the rising edge of the light emission period of the sensor light; and
start supplying a drive voltage to the heater within a light emission period of the sensor light emitted from the light emitter of the object detection sensor.

19. The control method according to claim 7, wherein the heater is a ZnO film provided inside the front cover of the vehicle lamp.

* * * * *